United States Patent Office 3,129,950
Patented Apr. 21, 1964

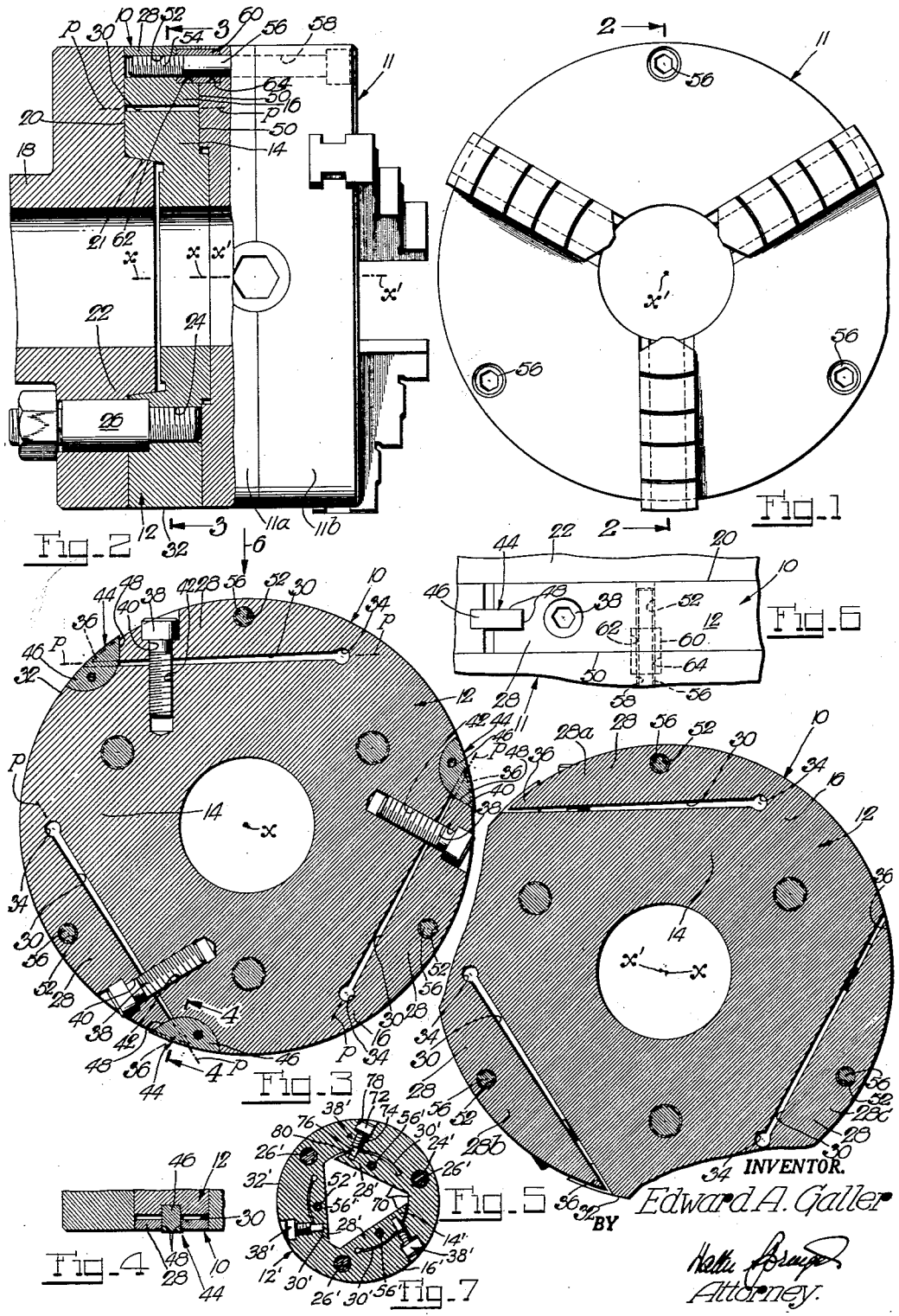

3,129,950
CENTER-ADJUSTABLE CHUCK ADAPTER
Edward A. Galler, Windsor, Conn., assignor to The Cushman Chuck Company, Hartford, Conn., a corporation of Connecticut
Filed July 16, 1962, Ser. No. 210,143
9 Claims. (Cl. 279—1)

This invention relates to chucks in general, and to chucks of center-adjustable type in particular.

Chucks of this type commonly have a mounting section and an associated chuck section arranged for movability on the mounting section and lock thereto in center-adjusted position by the usual adjustment screws. While these chucks are highly advantageous in that they may be kept on-center with fair accuracy for an incomparably longer time than non-adjustable standard chucks, they are nonetheless not used nearly as widely as standard chucks. This is due to the fact that chucks of center-adjustable type, owing to their construction in relatively movable sections, are special chucks of considerably higher cost than standard chucks.

It is the primary object of the present invention to provide a chuck adapter by means of which existing standard chucks may not only be readily converted into center-adjustable chucks, but may be so converted at a cost which is even less than the difference in cost between a standard chuck and a center-adjustable chuck.

It is another object of the present invention to provide a chuck adapter of this type which has all the elements necessary for center-adjustment of a standard chuck thereon, by being provided, like a center-adjustable chuck, with relatively adjustable sections which, however, are formed as integral adapter-mounting and chuck-carrying parts of a steel body of which one part is, by distortion within its elastic limit under the force and control of a few adjustment screws, adjustable relative to the other part. In thus arranging the adapter, the same is not only of the utmost structural simplicity and exceedingly low cost, but also introduces in the section adjustability by distortion thereof a new feature which is highly advantageous in that a work center on or gripped work in a chuck on the adapter will at any instant be firmly held in the exact center-to-center relation between the adapter sections, with ensuing facility in speedy and accurate chuck center adjustment while observing an indicator which during the adjustment task may be kept on the work center or gripped work.

It is a further object of the present invention to provide a chuck adapter of this type the aforementioned body of which is a steel ring which by simple slotting is divided into inner and outer sections of which one section constitutes an adapter mounting and the other section a chuck carrier, with the chuck carrier being formed within its peripheral extent with more than two angularly spaced cantilever formations or arms which are within their elastic limits flexible toward and away from the ring axis and have within their flexible extent single anchor holes for the reception of chuck bolts or screws, and with the sole remaining elements of the adapter being adjustment screws between the adapter mounting and respective cantilever arms for flexing the latter. In thus arranging the adapter, manipulation of the adjustment screws for adjustment of a mounted chuck, rather than causing uniform flexing or unflexing of the cantilever arms, will cause non-uniform flexing, under compression or tension, or both, of these arms as determined not only by the adjustment screws but also by the chuck which through intermediation of its mounting bolts or screws locks the cantilever arms at their holes against relative movement thereat toward or away from each other. However, while the mounted chuck will respond incrementally in the direction in which any of the cantilever arms responds to its adjustment screw either on tightening or loosening the same, and thus affords some ready guidance toward manipulating the adjustment screws for center adjustment of the chuck with a minimum of screw manipulations, the actual creep of the chuck at its center is but the resultant of the several variously-directed creep components thereof at the mounting bolts or screws on manipulating any one or more of the adjustment screws. It is thus inherent in the construction of the adapter that the creep of the chuck at its center in response to very slight but readily attainable adjustment of any of the screws is infinitely small, and it is for this reason that the adapter lends itself to chuck adjustment within exceedingly close tolerances of on-center accuracy. Moreover, while the chuck adjustment by the adapter is by resilient distortion of its carrier section, the adapter is readily designed so that this distortion is sufficiently powerful to hold even the closest adjustment at light or heavy chuck performance without undue tightening of the adjustment screws, thereby not only further facilitating accurate chuck center adjustment, but also avoiding the objectionable warping of prior chucks of this type by virtue of excessive tightening of their adjustment screws to withstand heavy-duty chuck operations.

Another object of the present invention is to provide a chuck adapter of this type of which the aforementioned cantilever arms will in response to screw adjustment invariably flex in a plane normal to the adapter axis even if they would for any reason whatever have a tendency to flex somewhat out of this plane, by confining their flexure to this plane only by simple key-and-slot connections with the adapter mounting section.

It is a further object of the present invention to provide a chuck adapter of this type of which the outer section of the aforementioned steel ring preferably constitutes the chuck carrier, thereby to afford cantilever arms which, despite great structural strength for their secure chuck-adjustment hold, may nevertheless be of abundant lengths for their resilient chuck-adjustment flexure on manipulation of the adjustment screws with reasonable force.

Another object of the present invention is to provide a chuck adapter of this type in which the adjustment screws are preferably near the free ends of the aforementioned cantilever arms, while the anchor holes are preferably substantially midway between the adjustment screws and the other ends of these cantilever arms, thereby to obtain fine incremental chuck-adjustment response to manipulation of the screws with reasonable force and to reasonably slight extents, as well as attain a maximum chuck adjustment range of the adapter.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a front view of a mounted chuck on an adapter which embodies the present invention;

FIG. 2 is a section and partial side view of the adapter and mounted chuck thereon, with the section taken on the line 2—2 of FIG. 1;

FIG. 3 is a cross-section through the adapter along the line 3—3 of FIG. 2;

FIG. 4 is a fragmentary section through the adapter substantially as taken on the line 4—4 of FIG. 3;

FIG. 5 is another cross-section through the adapter, showing the same in a chuck adjustment condition different from that in FIG. 3;

FIG. 6 is a fragmentary view of the adapter and mounted chuck as seen in the direction of the arrow 6 in FIG. 3; and FIG. 7 is a cross-section through an adapter embodying the present invention in a modified manner.

Referring to the drawings, the reference numeral 10 designates a chuck adapter to which is attached in this instance a standard chuck 11 the center of which is adjustable by means of the adapter 10. The adapter 10 has a body 12 which is preferably in the form of a steel disc or ring with an axis x having integral inner and outer parts or sections 14 and 16 which in the present instance are adapter-mounting and chuck-carrier sections, respectively. The mounting section 14 has suitable provisions for its releasable attachment to a power spindle 18 or the like (FIG. 2), such as the machined rear face 20 and frusto-conical recess 21 therein which fit the spindle nose 22, and tapped holes 24 for mounting bolts 26, for example, while the carrier section 16 is provided with peripheral cantilever formations or arms 28, presently three, which are arranged to be resiliently flexible, within their elastic limits, toward and away from the axis x. These arms 28, which have chuck mounting provisions described hereinafter, are designed for center-adjustment of a chuck thereon by their own distortion relative to the mounting section 14 of the adapter.

The arms 28 are formed on the adapter body 12 of preferred ring shape conveniently and advantageously by simply slotting the same at 30, with each slot 30 extending lengthwise to the outer body periphery 32 (FIGS. 3 and 5) and breadthwise the full width of the body 12 (FIG. 2), and preferably having a median plane p parallel to the axis x so that each arm 28 is bounded by the body periphery 32 and is part-segmental in longitudinal section. Preferably also, the slots 30 are equi-angularly spaced from each other and are of equal length from their inner ends at the runout holes 34 to their outer ends at the body periphery 32, and are also of equal and uniform widths in the non-flexed condition of the arms 28, and their median planes p are equally spaced from the axis x, so that the arms 28 are identical and equi-angularly spaced from each other. Furthermore, the slots 30 are preferably so arranged that the arms 28 extend lengthwise to their free ends 36 in the same direction peripherally of the adapter body 12, in this instance in counterclockwise direction (FIGS. 3 and 5).

For flexing the arms 28, there is provided a screw-type connection 38 between the mounting section 14 and each arm 28, with each connection 38 being in this instance a simple adjustment screw. For operative connection of these screws 38 with the mounting section 14 and arms 28, each arm 28 is provided, preferably near its outer or free end 36, with a bore 40 which extends at right angles to the median plane p of the nearby slot 30 and is in this instance counterbored from the outside for preferred reception of the screw head, while the mounting section 14 is provided with tapped holes 42 which are aligned with the bores 40 in the arms 28 and receive the threaded shanks of the screws 38 (FIG. 3). Thus, on tightening and then loosening the adjustment screws 38 the respective arms 28 will flex toward the axis x and unflex away therefrom, respectively.

While the arms 28 are arranged for, and the adjustment screws 38 compel, their flexure toward and away from the axis x in a plane normal to this axis, provisions are preferably made which positively lock the arms against flexure in any plane other than one normal to this axis. To this end, the mounting section 14 and arms 28 have key-and-slot connections 44 which in the present instance are pinned keys 46 in the mounting section 14 and slots 48 in the arms 28 into which the keys 46 extend with a sliding fit, with the slots 48 being provided preferably in the free ends 36 of the arms 28 (FIGS. 3 and 4).

The chuck mounting provisions on the adapter are in this instance machined rest surfaces 50 on, and holes 52 in, the arms 28, of which the rest surfaces 50 continue advantageously into the mounting section 14 and lie in a common plane normal to the axis x, and the holes 52 are, in the present instance, tapped for reception of the threaded shanks 54 of exemplary chuck mounting screws 56. The rest surfaces 50 accommodate most any standard chuck with a rear surface normal to its center axis, such as the exemplary chuck 11 (FIGS. 1 and 2) which may be a conventional scroll chuck of the type shown in the patent to Sloan, Number 2,562,067, dated July 24, 1951. The holes 52 in the arms 28 are in any event spaced from the associated adjustment screws 38 lengthwise of these arms, and are preferably located substantially midway between these adjustment screws and the ends of the arms adjacent the inner ends of the respective slots 30. Further, the holes 52 in the arms 28 of the adapter 10 are coordinated with each other either in the manner of existing holes 58 in the exemplary standard chuck 11 for screws (not shown) that normally hold the usual chuck sections 11a and 11b together, or in the manner of holes specially drilled into a standard chuck for its attachment to the adapter. With the holes 58 in the exemplarly standard chuck 11 being in this instance existing holes thereof, it is merely necessary to apply new and longer screws 56 to the chuck for its attachment to the adapter.

The chuck adapter 10 is preferably also provided with steel bushings 60 which are received in counterbores 62 in the holes 52 in the respective arms 28 and project beyond the rest surfaces 50 of the latter for their further reception in counterbores 64 in the holes 58 in the mounted chuck 11, with these counterbores 64 being readily provided in the chuck regardless of whether the holes 58 therein are existing holes or specially drilled holes.

While it is true that the holes 52 in the arms 28 of the adapter are coordinated in the manner of anchor holes in a standard chuck to be mounted thereon, such as the holes 58 in the exemplary chuck 11, the holes 52 are preferably so coordinated that they align with the chuck holes 58 when the arms 28 are held resiliently flexed by the adjustment screws 38 toward the axis x to an extent like or similar to that indicated in FIG. 3 by the narrowing width of the slots 30 toward their outer ends. Accordingly, the screws 56 in the chuck 11 cannot be applied to the holes 52 in the arms 28 and the bushings 60 cannot be applied to the counterbores 64 in the chuck unless at least two of the arms are flexed toward the axis x sufficiently to bring all bushings 60 into simultaneous alignment with all counterbores 64 in the chuck. However, in order that the chuck 11 may with its center axis x' coincide with the axis x of the adapter immediately on its mount thereon, it is preferable to flex all arms 28 evenly for mounting the chuck thereon.

Assuming now that the mounted chuck 11 on the evenly flexed arms 28 (FIG. 3) is, due to wear, off-center with respect to the adapter axis x and, hence, also the spindle axis, the chuck 11 is readily center-adjusted by manipulating the adjustment screws 38 in proper manner. To begin with, manipulation of the adjustment screws 38 in tightening or loosening fashion, rather than causing uniform flexing or unflexing of the arms 28, will cause non-uniform flexing, under compression or tension, or both, of these arms as determined not only by the adjustment screws 38 but also by the mounted chuck 11 which through intermediation of the bushings 60 and also the screws 56 locks the arms 28 against relative movement thereat toward or away from each other. Hence, any flexure of the arms 28 forced by manipulation of the adjustment screws 38 will by the interlock of these arms with each other at the bushings 60 and screws 56 be necessarily distorted from uniform flexure. Also, while the mounted chuck will respond incrementally in the direction in which any of the arms 28 responds to its adjustment screw 38 either on tightening or loosening the same, and thus affords some ready guidance toward manipulating the adjustment screws for center-adjustment of the mounted chuck with a minimum of screw manipulations, the actual creep of the chuck at its center is but the resultant of the several variously-directed creep components thereof at the bushings 60 and screws 56 as caused by the various flexures of the arms 28 on manipulating any one or more of the adjustment screws 38. It is thus also quite apparent that the creep of the chuck at its center in response to very slight but readily attainable adjustment of any of the screws 38 is infinitely small, and it is for this reason that the present adapter lends itself to chuck center adjustment within exceedingly close tolerances of on-center accuracy.

While it would be most difficult to analyze the exact flexures of the arms 28 in response to manipulation of any one or more of the adjustment screws 38, such an analysis is not at all necessary either for a full understanding of the function of these arms or for proper manipulation of the adjustment screws for chuck center adjustment. Thus, it suffices for an understanding of the action of the arms 28 on adjustment screw manipulation to consider the exemplary situation in FIG. 5, in which the arms 28a and 28b have by their respective adjustment screws been forced closer toward the adapter axis $x$ and the arm 28c has been permitted to recover somewhat away from this axis on loosening its adjustment screw correspondingly, all subsequent to the chuck center $x'$ having been found, by an indicator placed against a machined workpiece or truing bar gripped in the chuck, to be off-center from the adapter axis $x$ in the right direction but to the exaggerated extent shown in FIG. 5. Accordingly, by loosening the adjustment screw of the arm 28c and further tightening the adjustment screws of the two other arms 28a and 28b for forcing the latter further toward the adapter axis $x$ as shown in FIG. 5, the chuck center $x'$ will have been brought closer to the adapter axis $x$. That the responsive creep of the chuck at its center cannot be due to uniform flexure of the arms 28a and 28b toward the adapter axis $x$ is evidenced by the fact that these arms are, at the bushings 60 and also at the chuck screws 56 therein, locked to each other by the mounted chuck and, hence, are incapable to respond in uniform or simple flexure. Thus, the only manner in which the arms 28a and 28b can possibly respond to the aforementioned further tightening of their adjustment screws is in their flexure, under compression, over their lengths between their holes 52 and their inner ends in such wise as to bring their holes 52, at their locked spacing from each other, closer to the adapter axis $x$, with the remaining lengths of these arms 28a and 28b to their free ends 36 being permitted to respond in simple flexure owing to very slight lateral play in this instance of all adjustment screws in the respective arms.

In having adjusted the adapter in the exemplary manner shown in FIG. 5 and described above the chuck center may have been brought closer to the adapter axis $x$ or even beyond the same, and also most likely in a path which leads to either side of the adapter axis $x$ thus requiring further and corrective adjustments of the adapter, conveniently and expeditiously with the aid of an indicator placed against a gripped truing bar, for example, in the chuck. The general and most expeditious procedure in undertaking the necessary further corrective adjustments of the adapter is to further tighten the adjustment screw or screws of the arm or arms angularly nearest indicated high points on the exemplary truing bar, depending on the relative closeness of these high points to the nearest arms, and loosening the adjustment screw or screws of the other arm or arms, with the arms responding over their lengths from their holes 52 to their inner ends in various flexure either under compression or tension. A mounted chuck is thus adjusted on-center with fair accuracy after a few adjustments of the adapter, and with exceedingly close accuracy on perhaps a few more adjustments of the adapter.

As described, the chuck 11 is mounted on the adapter 10 when the arms 28 are preferably held under some flexure by the adjustment screws 38. This has the advantage that for all likely chuck-center adjustments the arms 28 will, by their resilient but nonetheless powerful distortion, securely hold the chuck adjustment without requiring tightening of the adjustment screws beyond that reasonable extent at which chuck-center adjustment will be accomplished most readily and accurately. It is good practice to mount the chuck on the adapter when the arms 28 thereof are held flexed to an extent at which the slots 30 are at their outer ends closed about half-way or thereabout, as in FIG. 3, thereby obtaining an optimum adjustment range within which the adapter will hold the chuck adjustment in the described advantageous manner.

The adapter 10 may, of course, be designed for most any resiliency and strength of its arms 28 best suited for particular chucks and their intended use from the lightest to the heaviest operations. Thus, the adapter may be designed with arms 28 of any number in excess of two, and of any appropriate lengths and other dimensions in comparison to the diameter of the adapter body of preferred ring shape. To the same end, the relative locations of the holes 52 in the arms 28 and the adjustment screws 38 thereon may be varied widely, though their relative location like or similar to that shown in FIG. 3 is quite satisfactory and even preferred for many chuck applications. Further, the arms 28 are preferably formed in an outer, rather than inner, section of the adapter body or ring, so that these arms may not only be of considerable radial dimensions and, hence, have ample strength in order securely to hold a chuck adjustment under even heavy chuck operations, but may also be of abundant lengths for their resilient chuck-adjustment distortion on manipulation of the adjustment screws with reasonable force. The key-and-slot connections 44 between the mounting section 14 and the arms 28 of the adapter are advantageous in that they assure distortion-response of these arms to the adjustment screws accurately in a plane normal to the adapter axis even if any of them should have a tendency to flex slightly out of this plane for any reason whatever, such as, for example, slight and even imperceptible imperfections of an arm or arms either in their machining or grain structure, or slight offset of any of the adjustment screws 38 from accurate center position between the rear and rest faces 20 and 50, respectively, of the arms (FIG. 6). Of further advantage to the same end is the extent of the plane rear faces 20 and plane rest surfaces 50 of the arms 28 over an adjoining part of the mounting section 14 of the adapter (FIG. 2), so that the arms 28 are for this reason alone confined in the present instance between the chuck on the mounting section 14 and the spindle nose 22 for flexure solely in a plane normal to the adapter axis.

In addition to its numerous aforementioned and other advantages, the present chuck adapter is also of remarkable structural simplicity and, hence, exceedingly low cost. Thus, the adapter consists of a minimum of simple parts of which the steel ring is the chief part and the remaining parts are standard screws and a few simple mass-produced bushings and keys, with the steel ring requiring but a few simple machining operations in forming the arms 28 and holes and slots for the reception of the screws, bushings and keys. However, even though the steel ring requires but a few simple machining operations, these are preferably highly accurate so that the adapter will, despite its low cost, have all the aspects of a high-precision tool. Further, owing to the fact that the chuck-adjustment arms are integral parts of the adapter body and respond in resilient distortion to manipulation of the adjustment screws with reasonable force, the adapter will perform with great precision and with hardly any wear almost indefinitely.

While the exemplary adapter 10 is shown and described as a unit separate from a chuck and adapted to mount a chuck of standard or any other type, it is, of course, entirely feasible to embody this unit in a self-contained center-adjustable chuck having all the advantages of the present adapter, by combining this unit with a chuck section similarly as the mounting and chuck sections of prior center-adjustable chucks.

While it has been previously mentioned that the arms 28 are preferably formed in an outer, rather than inner, section of the adapter body, it is, of course, fully within the purview of the present invention to form these arms in an inner section of the adapter body. Thus, FIG. 7 shows an adapter body 12' the arms 28' of which are formed in an inner part 14' of the body by slotting the same at 30', with each slot extending lengthwise to the inner body periphery or circumference 70 which in this instance is non-circular. The arms 28' are provided with tapped holes 52' for the reception of chuck attachment screws 56'. For flexing the arms 28', there is provided a screw-type connection 38' between each arm and the outer part 16' of the body, with each connection 38' being in this instance a simple adjustment screw with a head 72, a threaded shank 74 and a blank end shank 76. Each screw 38' is with its head 72 received in an enlarged bore 78 in the outer body periphery 32', and is with its shank 74 threadedly received in the outer part 16' of the body, while its blank shank 76 is seated in a recess 80 in an arm 28'. The outer part 16' of the body 12' has tapped holes 24' for the reception of bolts 26' by means of which the adapter body is releasably attached to a power spindle or the like.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. An adjustable chuck adapter, comprising a steel body with an axis having integral inner and outer parts about said axis of which one part provides more than two angularly spaced cantilever arms extending lengthwise in a common plane normal to said axis and being resiliently flexible toward and away from said axis, each of said arms having a chuck anchor formation about an axis parallel to said body axis and the other part having provisions for its releasable attachment to a chuck mounting spindle; and connections between said other part and said arms, respectively, spaced from the respective anchor formations lengthwise of said arms and operative to flex said arms.

2. An adjustable chuck adapter, comprising a steel disc with an axis having an outer periphery and more than two angularly spaced slots with median planes spaced from and parallel to said axis and extending lengthwise to said periphery and breadthwise the full width of said disc to form on said ring part-segmental cantilever arms, respectively, with the remainder of the ring serving as a mounting section having provisions for its releasable attachment to a chuck mounting spindle, said arms being resiliently flexible toward and away from said axis and each arm having a hole about an axis parallel to said disc axis; and screw-type connections between said mounting section and arms, respectively, nearer the free ends of said arms than said holes for flexing said arms.

3. An adjustable chuck adapter as set forth in claim 2, in which said slots are equi-angularly spaced from each other and of equal lengths and equal and uniform widths and their median planes are equally spaced from said disc axis.

4. An adjustable chuck adapter as set forth in claim 2, in which said slots are equi-angularly spaced from each other and of equal lengths and equal and uniform widths and their median planes are equally spaced from said discs axis, and said holes and screw-type connections are identical, respectively, with said holes being identically located on said arms and said connections being identically coordinated with the respective arms.

5. An adjustable chuck adapter as set forth in claim 2, in which said arms extend lengthwise to their free ends in the same direction peripherally of said disc.

6. An adjustable chuck adapter as set forth in claim 2, in which said arms have rest surfaces in a common plane normal to said disc axis, and said holes in said arms extend to the respective rest surfaces thereof and are counterbored at said surfaces, and there are further provided bushings in the counterbores in the respective arms and projecting beyond the rest surfaces thereof.

7. An adjustable chuck adapter as set forth in claim 2, in which said arms have at their free ends slots in planes normal to said disc axis, and there are further provided keys in said mounting section extending with a sliding fit into said end slots in said arms, respectively.

8. An adjustable chuck adapter as set forth in claim 2, in which said connections are single head screws, respectively, threadedly received in said mounting section and seated with their heads in the respective arms, with said screws extending with their axes normal to the median planes of the slots between said mounting section and respective arms.

9. A center-adjustable chuck, comprising a chuck unit with a center axis; an adjustment unit having a steel body with an axis and integral inner and outer parts about said body axis of which one part is a mounting part having provisions for its releasable attachment to a chuck mounting spindle and the other part is a carrier part, said carrier part including more than two angularly spaced cantilever arms extending lengthwise in a common plane normal to said body axis and being resiliently flexible toward and away from said body axis, with said arms having rest surfaces in a common plane normal to said body axis and each arm having a hole about an axis parallel to said body axis and extending to the rest surface thereof, and adjustable screw-type connections between said mounting part and arms, respectively, spaced from the respective holes lengthwise of said arms for flexing the latter; and connectors on said chuck unit received in said holes in said arms for securing said chuck unit to said rest surfaces of said arms and locking said arms to said chuck units against movement relative to each other and to said chuck unit at said holes only.

References Cited in the file of this patent

UNITED STATES PATENTS

| | | |
|---|---|---|
| 2,524,852 | Strauss | Oct. 10, 1950 |
| 2,860,882 | Whitney | Nov. 18, 1958 |
| 2,898,120 | Goepfrich | Aug. 4, 1959 |
| 2,984,494 | Alston | May 16, 1961 |